US009944863B2

(12) United States Patent
Zhang et al.

(10) Patent No.: US 9,944,863 B2
(45) Date of Patent: Apr. 17, 2018

(54) MIDDLE DISTILLATE HYDROCRACKING CATALYST

(71) Applicant: Chevron U.S.A. Inc., San Ramon, CA (US)

(72) Inventors: Yihua Zhang, Albany, CA (US); Theodorus Ludovicus Michael Maesen, Moraga, CA (US)

(73) Assignee: Chevron U.S.A. Inc., San Ramon, CA (US)

(*) Notice: Subject to any disclaimer, the term of this patent is extended or adjusted under 35 U.S.C. 154(b) by 0 days.

(21) Appl. No.: 15/291,823

(22) Filed: Oct. 12, 2016

(65) Prior Publication Data

US 2017/0029718 A1 Feb. 2, 2017

Related U.S. Application Data

(63) Continuation of application No. 14/260,421, filed on Apr. 24, 2014, now abandoned, and a continuation of application No. 14/260,441, filed on Apr. 24, 2014, now abandoned, and a continuation of application No. 14/260,456, filed on Apr. 24, 2014, now abandoned, and a continuation of application No. 14/260,484, filed on Apr. 24, 2014, now abandoned.

(51) Int. Cl.
| | |
|---|---|
| *C10G 47/20* | (2006.01) |
| *B01J 29/16* | (2006.01) |
| *B01J 29/064* | (2006.01) |
| *B01J 29/076* | (2006.01) |
| *B01J 35/00* | (2006.01) |
| *B01J 35/10* | (2006.01) |
| *B01J 21/12* | (2006.01) |
| *B01J 23/888* | (2006.01) |
| *B01J 29/08* | (2006.01) |
| *B01J 37/00* | (2006.01) |
| *B01J 37/02* | (2006.01) |
| *B01J 35/02* | (2006.01) |

(52) U.S. Cl.
CPC ............ *C10G 47/20* (2013.01); *B01J 21/12* (2013.01); *B01J 23/888* (2013.01); *B01J 29/064* (2013.01); *B01J 29/076* (2013.01); *B01J 29/084* (2013.01); *B01J 29/166* (2013.01); *B01J 35/0026* (2013.01); *B01J 35/1042* (2013.01); *B01J 35/1047* (2013.01); *B01J 35/1061* (2013.01); *B01J 37/0009* (2013.01); *B01J 37/0201* (2013.01); *B01J 35/002* (2013.01); *B01J 35/023* (2013.01); *B01J 35/108* (2013.01); *B01J 35/1019* (2013.01); *B01J 35/1023* (2013.01); *B01J 2229/20* (2013.01); *B01J 2229/42* (2013.01); *C10G 2300/1044* (2013.01); *C10G 2300/70* (2013.01)

(58) Field of Classification Search
CPC ... B01J 29/00; B01J 29/89; B01J 32/00; B01J 35/1033; B01J 35/1052; B01J 29/166; C10G 2300/1044; C10G 2300/1048; C10G 47/20

See application file for complete search history.

(56) References Cited

U.S. PATENT DOCUMENTS

| | | | |
|---|---|---|---|
| 4,913,799 A | 4/1990 | Gortsema et al. | |
| 5,114,563 A | 5/1992 | Lok et al. | |
| 5,198,203 A | 3/1993 | Kresge et al. | |
| 5,246,689 A | 9/1993 | Beck et al. | |
| 5,334,368 A | 8/1994 | Beck et al. | |
| 7,063,828 B2 | 6/2006 | Burton, Jr. et al. | |
| 2011/0000824 A1 | 1/2011 | Zhan et al. | |
| 2011/0132807 A1 | 6/2011 | Zhan et al. | |

FOREIGN PATENT DOCUMENTS

WO 2011002782 1/2011

OTHER PUBLICATIONS

T.J. Gricus Kofke, R.K. Gorte, W.E. Farneth, J. Catal. 114, 34-45, 1988.
T.J. Gricus Kifke, R.J. Gorte, G.T. Kokotailo, J. Catal. 115, 265-272, 1989.
J.G. Tittensor, R.J. Gorte and D.M. Chapman, J. Catal. 138, 714-720, 1992.
J. Am. Chem. Soc. 73, 373-380, 1951.
P.B. Weisz and J.N. Miale, J. Catal., 4, 527-529, 1965.
J.N. Miale, N.Y. Chen, and P.B. Weisz, J. Catal., 6, 278-87, 1966.
Maesen and Hertzenberg, Journal of Catalysis 182, 270-273 (1999).
J. Am. Chem. Soc., 114:10834 10843(1992).
MCM-48 (Kresge et al., Nature 359:710 (1992).
International Preliminary Report on Patentability/Written Opinion of the International Searching Authority.

*Primary Examiner* — Renee Robinson
*Assistant Examiner* — Derek Mueller
(74) *Attorney, Agent, or Firm* — Mark L. Warzel

(57) ABSTRACT

The present invention is directed to an improved hydrocracking catalyst containing an amorphous silica-alumina (ASA) base and alumina support. The ASA base is characterized as having a high nanopore volume and low particle density. The alumina support is characterized as having a high nanopore volume. Hydrocracking catalysts employing the combination high nanopore volume ASA base and alumina support exhibit improved hydrogen efficiency, and greater product yield and quality, as compared to hydrocracking catalysts containing conventional ASA base and alumina components.

20 Claims, No Drawings

MIDDLE DISTILLATE HYDROCRACKING CATALYST

CROSS REFERENCE TO RELATED APPLICATIONS

This application is related to U.S. patent application Ser. Nos. 14/260,421, 14/260,441, 14/260,456, and 14/260,484, all filed Apr. 24, 2014, herein incorporated in their entirety.

FIELD OF THE INVENTION

The present invention is directed to an improved hydrocracking catalyst containing a high nanopore volume (HNPV) amorphous silica-alumina (ASA) component in combination with a HNPV alumina support. The HNPV ASA component is also characterized as having a low particle density. The HNPV ASA component and HNPV alumina support are combined to form a HNPV base extrudate suitable for manufacturing the finished improved hydrocracking catalyst of the present invention.

Finished hydrocracking catalysts employing the HNPV ASA component in combination with a HNPV alumina support exhibit improved hydrogen efficiency, and greater product yield and quality, as compared to conventional hydrocracking catalysts.

BACKGROUND OF THE INVENTION

Catalytic hydroprocessing refers to petroleum refining processes in which a carbonaceous feedstock is brought into contact with hydrogen and a catalyst, at a higher temperature and pressure, for the purpose of removing undesirable impurities and/or converting the feedstock to an improved product.

Heavy hydrocarbon feedstocks can be liquid, semi-solid and/or solid at atmospheric conditions. Such heavy hydrocarbonaceous feedstocks can have an initial ASTM D86-12 boiling point of 600° F. (316° C.) or greater.

The feedstock properties that influence its hydroprocessability include: organic nitrogen content, especially basic nitrogen content; feed boiling range and end point; polycyclic aromatics content and previous processing history (i.e., straight run versus thermally cracked).

Heavy hydrocarbonaceous oils boiling in the gas oil range can be high in heteroatom content, especially nitrogen. Nitrogen content can range from about 50 ppmw to greater than 5000 ppmw elemental nitrogen, based on total weight of the heavy hydrocarbonaceous oils. The nitrogen containing compounds can be present as basic or non-basic nitrogen species. Examples of basic nitrogen species include pyridines, alkyl substituted pyridines, quinolones, alkyl substituted quinolones, acridines, alkyl substituted acridines, phenyl and naphtha substituted acridines. Examples of non-basic nitrogen species include pyrroles, alkyl substituted pyrroles, indoles, alkyl substituted indoles, carbazoles and alkyl substituted carbazoles.

Heavy hydrocarbonaceous oils boiling in the gas oil range can have sulfur contents ranging from about 500 ppmw to about 100,000 ppmw elemental sulfur (based on total weight of the heavy hydrocarbonaceous oils). The sulfur will usually be present as organically bound sulfur. Examples of such sulfur compounds include the class of heterocyclic sulfur compounds including but not limited to thiophenes, tetrahydrothiophenes, benzothiophenes and their higher homologues and analogues. Other orgranically bound sulfur compounds include aliphatic, naphthenic and aromatic mercaptans, sulfides, disulfides and polysulfides.

Gas oil range feeds contain polycyclic condensed hydrocarbons having two or more fused rings. The rings can either be saturated or unsaturated (aromatic). For the latter, these polycyclic condensed hydrocarbons are also called polynuclear aromatics (PNA) or polyaromatic hydrocarbons (PAH). The light PNAs, with two to six rings, are present in virgin vacuum gas oil streams. The heavy PNAs (HPNA) generally contain 7-10 rings, but can contain higher amounts including 11 rings or at least 14 rings or dicoronylene (15-rings) or coronylenovalene (17-rings) or higher.

Hydrocracking is an important refining process used to process manufacture middle distillate products boiling in the 250-700° F. (121-371° C.) range, such as, kerosene, and diesel. Hydrocracking feedstocks contain significant amounts of organic sulfur and nitrogen. The sulfur and nitrogen must be removed to meet fuel specifications.

Generally, conventional hydrocracking catalysts are composed of (1) at least one acidic component which can be crystallized aluminosilicate and/or amorphous silica alumina; (2) a binding material such as alumina, titania, silica, etc; and (3) one or more metals selected from Groups 6 and 8-10 of the Periodic Table, particularly nickel, cobalt, molybdenum and tungsten.

There are two broad classes of reactions that occur in the hydrocracking process. The first class of reactions involves hydrotreating, in which impurities such as nitrogen, sulfur, oxygen, and metals are removed from the feedstock. The second class of reactions involves hydrocracking, in which carbon-carbon bonds are cleaved or hydrocracked, in the presence of hydrogen, to yield lower boiling point products.

Hydrocracking catalysts are bifunctional: hydrotreating is facilitated by the hydrogenation function provided by the metal components, and the cracking reaction is facilitated by the solid acid components. Both reactions need the presence of high pressure hydrogen.

During hydrocracking, the heavy hydrocarbon feed molecules form a liquid film and covers the active sites of the catalyst. Due to the limitation of hydrogen solubility in hydrocarbons, the hydrogen availability in the hydrocracking catalyst extrudates has been an issue. In practice, the heavy hydrocarbon feed fills the pores first, and reactant hydrogen must then access the active sites in the pores via diffusion through the heavy hydrocarbon feed. Conventional hydrocracking catalysts exhibit limited hydrogen pore diffusivity with heavy, more refractive feedstocks. This has inhibited the hydrogenation function of the hydrocracking catalysts, which results in middle distillates and unconverted oil (UCO) products with poor quality. This issue becomes more significant when the hydrocracking feed become more disadvantaged, as these feeds consume greater amounts of hydrogen during hydroprocessing, making even less hydrogen available for diffusion into the pores.

Accordingly, there is a current need for a hydrocracking catalyst that exhibits a higher degree of hydrogen efficiency, and greater product yield and quality, as compared to conventional hydrocracking catalysts.

SUMMARY OF THE INVENTION

The present invention is directed to an improved finished hydrocracking catalyst containing a HNPV ASA component in combination with a HNPV alumina support. The ASA base is characterized as having a low particle density. The HNPV ASA component employed in the catalyst of the present invention is characterized as having a narrower pore size distribution as compared to a conventional ASA, and the alumina support is characterized as having a broader pore size distribution as compared to an alumina base used in conventional hydrocracking catalysts.

It has been found that by employing ASA and alumina materials having a higher nanopore volume in the 6 to 11 nm range, the base extrudate exhibits a lower particle density. A lower base extrudate particle density allows for increased metals loading while maintaining a conventional particle density for the finished hydrocracking catalyst. The finished hydrocracking catalysts employing using the novel combination of the HNPV ASA component and HNPV alumina support exhibit improved hydrogen efficiency, and greater product yield and quality as compared to conventional hydrocracking catalysts containing conventional ASA and alumina components. This unique combination of the ASA and alumina support provides for a finished hydrocracking catalyst that is particularly suited for hydroprocessing disadvantaged feedstocks.

DETAILED DESCRIPTION OF THE INVENTION

Introduction

"Periodic Table" refers to the version of IUPAC Periodic Table of the Elements dated Jun. 22, 2007, and the numbering scheme for the Periodic Table Groups is as described in Chemical and Engineering News, 63(5), 27 (1985).

"Hydroprocessing" or "hydroconversion" refers to a process in which a carbonaceous feedstock is brought into contact with hydrogen and a catalyst, at a higher temperature and pressure, for the purpose of removing undesirable impurities and/or converting the feedstock to a desired product. Such processes include, but not limited to, methanation, water gas shift reactions, hydrogenation, hydrotreating, hydrodesulphurization, hydrodenitrogenation, hydrodemetallation, hydrodearomatization, hydroisomerization, hydrodewaxing and hydrocracking including selective hydrocracking. Depending on the type of hydroprocessing and the reaction conditions, the products of hydroprocessing can show improved physical properties such as improved viscosities, viscosity indices, saturates content, low temperature properties, volatilities and depolarization.

"Hydrocracking" refers to a process in which hydrogenation and dehydrogenation accompanies the cracking/fragmentation of hydrocarbons, e.g., converting heavier hydrocarbons into lighter hydrocarbons, or converting aromatics and/or cycloparaffins (naphthenes) into non-cyclic branched paraffins.

"Column" refers to a distillation column or columns for separating a feedstock into one or more fractions having differing cut points.

"Cut point" refers to the temperature on a True Boiling Point ("TBP") curve (i.e., a batch process curve of percent of feed removed in a heavily refluxed tower versus temperature reached to achieve that removal) at which a predetermined degree of separation is reached.

"True Boiling Point" (TBP) refers to the boiling point of a feed which as determined by ASTM D2887-13.

"Bottoms fraction" means the heavier fraction, separated by fractionation from a feedstock, as a non-vaporized (i.e. residuum) fraction.

"Hydrocracked heavy fraction" means the heavy fraction after having undergone hydrocracking.

"Hydrocarbonaceous" means a compound or substance that contains hydrogen and carbon atoms, but which can include heteroatoms such as oxygen, sulfur or nitrogen.

"Middle distillates" include jet fuel, diesel fuel, and kerosene.

| Products | Typical Cut Points, ° F. (° C.) For North American Market |
|---|---|
| Light Naphtha | $C_5$-180 ($C_5$-82) |
| Heavy Naphtha | 180-300 (82-149) |
| Jet | 300-380 (149--193) |
| Kerosene | 380-530 (193-277) |
| Diesel | 530-700 (277-371) |

"LHSV" means liquid hourly space velocity.

"SCF/BBL" (or scf/bbl, or scfb or SCFB) refers to a unit of standard cubic foot of gas ($N_2$, $H_2$, etc.) per barrel of hydrocarbon feed.

"Nanopore" means pores having a diameter between 2 nm and 50 nm, inclusive.

Where permitted, all publications, patents and patent applications cited in this application are herein incorporated by reference in their entirety; to the extent such disclosure is not inconsistent with the present invention.

Unless otherwise specified, the recitation of a genus of elements, materials or other components, from which an individual component or mixture of components can be selected, is intended to include all possible sub-generic combinations of the listed components and mixtures thereof. Also, "include" and its variants are intended to be non-limiting, such that recitation of items in a list is not to the exclusion of other like items that may also be useful in the materials, compositions and methods of this invention.

All numerical ranges stated herein are inclusive of the lower and upper values stated for the range, unless stated otherwise.

Properties for materials described herein are determined as follows:

(a) Constrained index (CI): indicates the total cracking conversion of a 50/50 mixture of n-hexane and 3-methylpentane by a sample catalyst at 900° F. (482° C.), 0.68 WHSV. Samples are prepared according to the method described in U.S. Pat. No. 7,063,828 to Zones and Burton, issued Jun. 20, 2006.

(b) Brønsted acidity: determined by isopropylamine-temperature-programmed desorption (IPam TPD) adapted from the published descriptions by T. J. Gricus Kofke, R. K. Gorte, W. E. Farneth, J. Catal. 114, 34-45, 1988; T. J. Gricus Kifke, R. J. Gorte, G. T. Kokotailo, J. Catal. 115, 265-272, 1989; J. G. Tittensor, R. J. Gorte and D. M. Chapman, J. Catal. 138, 714-720, 1992.

(c) $SiO_2/Al_2O_3$ Ratio (SAR): determined by ICP elemental analysis. A SAR of infinity ($\infty$) represents the case where there is no aluminum in the zeolite, i.e., the mole ratio of silica to alumina is infinity. In that case the molecular sieve is comprised of essentially all of silica.

(d) Surface area: determined by $N_2$ adsorption at its boiling temperature. BET surface area is calculated by the 5-point method at $P/P_0$=0.050, 0.088, 0.125, 0.163, and 0.200. Samples are first pre-treated at 400° C. for 6 hours in the presence of flowing, dry $N_2$ so as to eliminate any adsorbed volatiles like water or organics.

(e) Nanopore and micropore volume: determined by $N_2$ adsorption at its boiling temperature. Micropore volume is calculated by the t-plot method at $P/P_0$=0.050, 0.088, 0.125, 0.163, and 0.200. Samples are first pre-treated at 400° C. for 6 hours in the presence of flowing, dry $N_2$ so as to eliminate any adsorbed volatiles like water or organics.

(f) Nanopore diameter: determined by $N_2$ adsorption at its boiling temperature. Mesopore pore diameter is calculated from $N_2$ isotherms by the BJH method described in E. P. Barrett, L. G. Joyner and P. P. Halenda, "The determination of pore volume and area distributions in porous substances. I. Computations from nitrogen isotherms." J. Am. Chem. Soc. 73, 373-380, 1951. Samples are first pre-treated at 400° C. for 6 hours in the presence of flowing, dry $N_2$ so as to eliminate any adsorbed volatiles like water or organics.

(g) Total nanopore volume: determined by $N_2$ adsorption at its boiling temperature at $P/P_0=0.990$. Samples are first pre-treated at 400° C. for 6 hours in the presence of flowing, dry $N_2$ so as to eliminate any adsorbed volatiles like water or organics.

(h) Unit cell size: determined by X-ray powder diffraction.

(i) Alpha value: determined by an Alpha test adapted from the published descriptions of the Mobil Alpha test (P. B. Weisz and J. N. Miale, J. Catal., 4, 527-529, 1965; J. N. Miale, N. Y. Chen, and P. B. Weisz, J. Catal., 6, 278-87, 1966). The "Alpha Value" is calculated as the cracking rate of the sample in question divided by the cracking rate of a standard silica alumina sample. The resulting "Alpha" is a measure of acid cracking activity which generally correlates with number of acid sites.

(j) API gravity: the gravity of a petroleum feedstock/product relative to water, as determined by ASTM D4052-11.

(k) Polycyclic index (PCI): as measured by ASTM D6397-11.

(l) Viscosity index (VI): an empirical, unit-less number indicated the effect of temperature change on the kinematic viscosity of the oil. The higher the VI of a base oil, the lower its tendency to change viscosity with temperature. Determined by ASTM 2270-04.

(m) Viscosity: a measure of fluid's resistance to flow as determined by ASTM D445.

(n) Loose bulk density: weight per unit volume of powder or extrudate in a loose condition as determined by ASTM D7481.

(o) Water pore volume: a test method to determine the amount of water that a gram of catalyst can hold in its pores. Weigh out 5-10 grams of sample (or amount specified by the engineer) in a 150 ml. beaker (plastic). Add deionized water enough to cover the sample. Allow to soak for 1 hour. After 1 hour, decant the liquid until most of the water has been removed and get rid of excess water by allowing a paper towel absorb the excess water. Change paper towel until there is no visible droplets on the walls of the plastic beaker. Weigh the beaker with sample. Calculate the Pore volume as follows: F−I=W*
F=final weight of sample
I=initial weight of sample
W*=weight or volume of water in the sample
PV=W*/I (unit is cc/gm)

(p) Acid site density: temperature-programmed desorption (TPD) of isopropylamine (IPAm) to quantify the Brønsted acid site distribution of a material is described by Maesen and Hertzenberg, Journal of Catalysis 182, 270-273 (1999).

(q) Particle density: Particle density is obtained by applying the formula D=M/V. M is the weight and V is the volume of the catalyst sample. The volume is determined by measuring volume displacement by submersing the sample into mercury under 28 mm Hg vacuum.

Hydrocracking Catalyst Composition

Catalysts used in carrying out the hydrocracking process includes an amorphous silica-alumina (ASA) component characterized as having a high nanopore volume (HNPV) and low particle density, a HNPV alumina support, one or more metals, one or more molecular sieves, and optionally one or more promoters. The composition of the finished catalyst, based on the bulk dry weight of the finished hydrocracking catalyst, is described in Table 1 below.

TABLE 1

| HNPV ASA component | 15-85 wt. % |
| HNPV alumina support | 5-55 wt. % |
| total molecular sieve content | 0.1-75 wt. % |
| total metal oxide content | 15-55 wt. % |
| total promoter content | 0-15 wt. % |

For each embodiment described herein, the HNPV ASA component is characterized as having a low particle density. In addition, the HNPV ASA component employed in the catalyst of the present invention is characterized as having a narrower pore size distribution as compared to conventional ASA materials. The alumina support is characterized as having a broader pore size distribution as compared to an alumina base used in conventional hydrocracking catalysts.

A HNPV ASA used in the manufacture the finished hydrocracking catalyst of the present invention will have a NPV (6 nm-11 nm) of 0.6 to 0.9 cc/g.

A HNPV alumina extrudate used in the manufacture the finished hydrocracking catalyst of the present invention will have a NPV (6 nm-11 nm) of 0.1 to 0.3 cc/g.

The HNPV ASA component and HNPV alumina support are combined to form a HNPV base extrudate suitable for increased metal loading on the finished improved hydrocracking catalyst of the present invention. As used herein, the term HNPV base extrudate means the base extrudate has a total nanopore volume that is greater than a conventional base containing conventional ASA and alumina materials. A HNPV base extrudate used to manufacture the finished hydrocracking catalyst of the present invention will have a NPV (6 nm-11 nm) of 0.1 to 1.0 cc/g.

It has been found that by employing ASA and alumina materials having a higher nanopore volume in the 6 to 11 nm range, the base extrudate exhibits a lower particle density. A lower base extrudate particle density allows for increased metals loading while maintaining a conventional particle density for the finished hydrocracking catalyst.

Finished hydrocracking catalysts manufactured using the HNPV base extrudate of the present invention exhibit improved hydrogen efficiency, and greater product yield and quality as compared to conventional hydrocracking catalysts containing conventional ASA and alumina components.

The HNPV ASA and HNPV alumina support components useful in the hydrocracking catalysts of the present invention, and base extrudates formed from these components, are characterized as having the properties described in Tables 2 and 3 below.

TABLE 2

|  | HNPV ASA | HNPV alumina |
| --- | --- | --- |
| d10 (nm) | 55-70 | 60-70 |
| d50 (nm) | 100-110 | 140-160 |
| d90 (nm) | 270-300 | 180-220 |
| Peak Pore Diameter (Å) | 80-100 | 160-200 |
| NPV-6 nm-11 nm (cc/g) | 0.6-0.9 | 0.1-0.3 |

TABLE 2-continued

|  | HNPV ASA | HNPV alumina |
|---|---|---|
| NPV-11 nm-20 nm (cc/g) | 0.4-0.7 | 0.4-0.7 |
| NPV-20 nm-50 nm (cc/g) | 0.2-0.4 | 0-0.3 |
| Total NPV (2-50 nm) (cc/g) | 1.5-2.0 | 0.7-1.2 |
| loose bulk density (g/mL) | 0.15-0.35 | 0.4-0.6 |
| BET surface area (m$^2$/g) | 450-600 | 180-350 |

TABLE 3

|  | HNPV Base Extrudate |
|---|---|
| d10 (nm) | 40-60 |
| d50 (nm) | 70-90 |
| d90 (nm) | 90-120 |
| Peak Pore Diameter (Å) | 70-100 |
| NPV-6 nm-11 nm (cc/g) | 0.5-0.9 |
| NPV-11 nm-20 nm (cc/g) | 0.05-0.25 |
| NPV-20 nm-50 nm (cc/g) | 0-0.1 |
| Total NPV (2-50 nm) (cc/g) | 0.7-1.2 |
| BET surface area (m$^2$/g) | 400-600 |
| WPV (water pore volume) (g/cc) | 0.85-1.25 |
| particle density (g/cc) | 0.7-0.9 |

For each embodiment described herein, the amount of HNPV ASA component in the finished hydrocracking catalyst is from 15 wt. % to 85 wt. % based on the bulk dry weight of the hydrocracking catalyst. In one subembodiment, the amount of HNPV ASA component in the hydrocracking catalyst is from 25 wt. % to 75 wt. % based on the bulk dry weight of the finished hydrocracking catalyst For each embodiment described herein, the hydrocracking catalyst contains one or more molecular sieves selected from the group consisting of BEA-, ISV-, BEC-, IWR-, MTW-, *STO-, OFF-, MAZ-, MOR-, MOZ-, AFI-, *NRE, SSY-, FAU-, EMT-, ITQ-21-, ERT-, ITQ-33-, and ITQ-37-type molecular sieves, and mixtures thereof.

In one subembodiment, the one or more molecular sieves selected from the group consisting of molecular sieves having a FAU framework topology, molecular sieves having a BEA framework topology, and mixtures thereof.

The amount of molecular sieve material in the finished hydrocracking catalyst is from 0.1 wt. % to 75 wt. % based on the bulk dry weight of the hydrocracking catalyst. In one subembodiment, the amount of molecular sieve material in the finished hydrocracking catalyst is from 1 wt. % to 8 wt. %.

The finished catalyst may optionally contain a non-zeolitic molecular sieves which can be used include, for example, silicoaluminophosphates (SAPO), ferroaluminophosphate, titanium aluminophosphate and the various ELAPO molecular sieves described in U.S. Pat. No. 4,913,799 and the references cited therein. Details regarding the preparation of various non-zeolite molecular sieves can be found in U.S. Pat. No. 5,114,563 (SAPO); U.S. Pat. No. 4,913,799 and the various references cited in U.S. Pat. No. 4,913,799. Mesoporous molecular sieves can also be used, for example the M41S family of materials (J. Am. Chem. Soc., 114:10834 10843(1992)), MCM-41 (U.S. Pat. Nos. 5,246,689; 5,198,203; 5,334,368), and MCM-48 (Kresge et al., Nature 359:710 (1992)).

In one subembodiment, the molecular sieve is a Y zeolite with a unit cell size of 24.15 Å-24.45 Å. In another subembodiment, the molecular sieve is a Y zeolite with a unit cell size of 24.15 Å-24.35 Å. In another subembodiment, the molecular sieve is a low-acidity, highly dealuminated ultrastable Y zeolite having an Alpha value of less than 5 and a Brønsted acidity of from 1 to 40. In one subembodiment, the molecular sieve is a Y zeolite having the properties described in Table 4 below.

TABLE 4

| Alpha value | 0.01-5 |
|---|---|
| Cl | 0.05-5% |
| Brønsted acidity | 1-80 μmole/g |
| acid site density | 0.9-2 mmol/g |
| SAR | 15-150 |
| surface area | 600-900 m$^2$/g |
| micropore volume | 0.25-0.30 mL/g |
| total pore volume | 0.51-0.55 mL/g |
| unit cell size | 24.15-24.35 Å |

In another subembodiment, the molecular sieve is a Y zeolite having the properties described in Table 5 below.

TABLE 5

| SAR | 10-∞ |
|---|---|
| micropore volume | 0.15-0.27 mL/g |
| BET surface area | 700-825 m$^2$/g |
| unit cell size | 24.15-24.45 Å |

As described herein above, the finished hydrocracking catalyst of the present invention contains one or more metals. For each embodiment described herein, each metal employed is selected from the group consisting of elements from Group 6 and Groups 8 through 10 of the Periodic Table, and mixtures thereof. In one subembodiment, each metal is selected from the group consisting of nickel (Ni), cobalt (Co), iron (Fe), chromium (Cr), molybdenum (Mo), tungsten (W), and mixtures thereof. In another subembodiment, the hydrocracking catalyst contains at least one Group 6 metal and at least one metal selected from Groups 8 through 10 of the Periodic Table. Exemplary metal combinations include Ni/Mo/W, Ni/Mo, Ni/W, Co/Mo, Co/W, Co/W/Mo and Ni/Co/W/Mo.

The total amount of metal oxide material in the finished hydrocracking catalyst is from 15 wt. % to 55 wt. % based on the bulk dry weight of the hydrocracking catalyst. In one subembodiment, the hydrocracking catalyst contains from 30 wt. % to 50 wt. % of nickel oxide and from 15 wt. % to 25 wt. % of tungsten oxide based on the bulk dry weight of the hydrocracking catalyst.

The finished hydrocracking catalyst of the present invention may contain one or more promoters selected from the group consisting of phosphorous (P), boron (B), fluorine (F), silicon (Si), aluminum (Al), zinc (Zn), manganese (Mn), and mixtures thereof. The amount of promoter in the hydrocracking catalyst is from 0 wt. % to 15 wt. % based on the bulk dry weight of the hydrocracking catalyst. In one subembodiment, the amount of promoter in the hydrocracking catalyst is from 1 wt. % to 5 wt. % based on the bulk dry weight of the hydrocracking catalyst.

Hydrocracking Catalyst Preparation

In general, the hydrocracking catalyst of the present invention is prepared by:
(a) mixing and pepertizing the HNPV ASA and HNPV alumina support with at least one molecular sieve and a support to make an extrudate base;
(b) impregnate the base with a metal impregnation solution containing at least one metal; and
(c) post-treating the extrudates, including subjecting the metal-loaded extrudates to drying and calcination.

Prior to impregnation, the extrudate base is dried at temperature between 90° C. and 150° C. (194° F.-302° F.)

for 1-12 hours, followed by calcination at one or more temperatures between 350° C. and 700° C. (662° F.-1292° F.).

The impregnation solution is made by dissolving metal precursors in deionized water. The concentration of the solution was determined by the pore volume of the support and metal loading. During a typical impregnation, the support is exposed to the impregnation solution for 0.1-10 hours. After soaking for another 0.1-10 hours, the catalyst is dried at one or more temperatures in the range of 38° C.-149° C. (100° F.-300° F.) for 0.1-10 hours. The catalyst is further calcined at one or more temperatures in the range of 316° C.-649° C. (600° F.-1200° F.), with the presence of sufficient air flow, for 0.1-10 hours.

In one embodiment, the impregnation solution further contains a modifying agent for promoting the deposition of the at least one metal. Modifying agents, as well as methods of making hydrocracking catalysts using such modifying agents, are disclosed in U.S. Publication Nos. 20110000824 and 20110132807 to Zhan et al., published Jan. 6, 2011 and Jun. 9, 2011, respectively.

Hydrocracking Overview

The hydrocracking catalyst of the present invention is suitable for hydroprocessing a variety of hydrocarbonaceous feedstocks, including disadvantaged feedstocks that are normally not conducive to middle distillate production using a conventional one- or two-stage hydrocracking process, such as visbroken gas oils, heavy coker gas oils, gas oils derived from residue hydrocracking or residue desulfurization, other thermally cracked oils, de-asphalted oils, Fischer-Tropsch derived feedstocks, cycle oils from an FCC unit, heavy coal-derived distillates, coal gasification byproduct tars, and heavy shale-derived oils, organic waste oils such as those from pulp/paper mills or waste biomass pyrolysis units.

Table 6 below lists the typical physical properties for a feedstock suitable for manufacturing middle distillates using the catalyst of the present invention, and Table 7 illustrates the typical hydrocracking process conditions.

TABLE 6

| Properties | Feedstock |
| --- | --- |
| Gravity, °API | 13.5-22.0 |
| N, ppm | 0.5-2,000 |
| S, wt % | 0-3 |
| Polycyclic index (PCI) | 1500-3000 |
| Distillation Boiling Point Range ° F. (° C.) | 700-1200 |

TABLE 7

| Hydrocracking Conditions | |
| --- | --- |
| Liquid hourly space velocity (LHSV) | 0.1-5 hr$^{-1}$ |
| H$_2$ partial pressure | 800-3,500 psig |
| H$_2$ consumption rate | 200-20,000 SCF/Bbl |
| H$_2$ recirculation rate | 50-5,000 SCF/Bbl |
| Operating temperature | 200-500° C. (392-932° F.) |
| Conversion (%) | 30-90 |

Prior to introduction of the hydroprocessing feed, the catalyst is activated by contacting with petroleum liquid containing sulfiding agent at a temperature of 200° F. to 800° F. (66° C. to 482° C.) from 1 hour to 7 days, and under a H$_2$-containing gas pressure of 100 kPa to 25,000 kPa. Suitable sulfiding agents include elemental sulfur, ammonium sulfide, ammonium polysulfide ([(NH$_4$)$_2$S$_x$), ammonium thiosulfate ((NH$_4$)$_2$S$_2$O$_3$), sodium thiosulfate (Na$_2$S$_2$O$_3$), thiourea CSN$_2$H$_4$, carbon disulfide, dimethyl disulfide (DMDS), dimethyl sulfide (DMS), dibutyl polysulfide (DBPS), mercaptanes, tertiarybutyl polysulfide (PSTB), tertiarynonyl polysulfide (PSTN), aqueous ammonium sulfide.

As noted above, the finished hydrocracking catalysts employing using the novel combination of the HNPV ASA component and HNPV alumina support exhibit improved hydrogen efficiency, and greater product yield and quality as compared to conventional hydrocracking catalysts containing conventional ASA and alumina components. This unique combination of the ASA and alumina support provides for a finished hydrocracking catalyst that is particularly suited for hydroprocessing disadvantaged feedstocks.

Depending on the feedstock, target product slate and amount of available hydrogen, the catalyst of the present invention can be used alone or in combination with other conventional hydrocracking catalysts.

In one embodiment, the catalyst is deployed in one or more fixed beds in a single stage hydrocracking unit, with or without recycle (once-through). Optionally, the single-stage hydrocracking unit may employ multiple single-stage units operated in parallel.

In another embodiment, the catalyst is deployed in one or more beds and units in a two-stage hydrocracking unit, with and without intermediate stage separation, and with or without recycle. Two-stage hydrocracking units can be operated using a full conversion configuration (meaning all of the hydrotreating and hydrocracking is accomplished within the hydrocracking loop via recycle). This embodiment may employ one or more distillation units within the hydrocracking loop for the purpose of stripping off product prior to the second stage hydrocracking step or prior to recycle of the distillation bottoms back to the first and/or second stage.

Two stage hydrocracking units can also be operated in a partial conversion configuration (meaning one or more distillation units are positioned within hydrocracking loop for the purpose of stripping of one or more streams that are passed on for further hydroprocessing). Operation of the hydrocracking unit in this manner allows a refinery to hydroprocess highly disadvantaged feedstocks by allowing undesirable feed components such as the polynuclear aromatics, nitrogen and sulfur species (which deactivate hydrocracking catalysts) to pass out of the hydrocracking loop for processing by equipment better suited for processing these components, e.g. an FCC unit.

In one embodiment, the catalyst is used in the first stage and optionally the second stage of a partial conversion, two-stage hydrocracking configuration which is well suited for making at least one middle distillate and a heavy vacuum gas fluidized catalytic cracking feedstock (HVGO FCC), by:

(a) hydrocracking a hydrocarbonaceous feedstock to produce a first stage hydrocracked effluent;

(b) distilling the hydrocracked feedstock by atmospheric distillation to form at least one middle distillate fraction and an atmospheric bottoms fraction;

(c) further distilling the atmospheric bottoms fraction by vacuum distillation to form a side-cut vacuum gas oil fraction and a heavy vacuum gas oil FCC feedstock;

(d) hydrocracking the side-cut vacuum gas oil fraction to form a second stage hydrocracked effluent; and (e) combining the second stage hydrocracked effluent with the first stage hydrocracked effluent.

The refinery configuration illustrated above has several advantages over conventional two-stage hydrocracking schemes. First, in this configuration, the catalyst and operating conditions of the first stage are selected to yield a HVGO FCC stream having only the minimum feed qualities necessary to produce FCC products which meet the established commercial specifications. This is in contrast to a conventional two-stage hydrocracking scheme where the first stage hydrocracking unit is operated at a severity necessary to maximize distillate yield which, in turn, requires the unit to be operated at more severe conditions (which requires more hydrogen and reduces the life of the catalyst).

Second, the side-cut VGO sent to the second stage hydrocracker unit is cleaner and easier to hydrocrack than a conventional second stage hydrocracker feed. Therefore, higher quality middle distillate products can be achieved using a smaller volume of second stage hydrocracking catalyst which, in turn, allows for the construction of a smaller hydrocracker reactor and consumption of less hydrogen. The second stage hydrocracking unit configuration reduces construction cost, lowers catalyst fill cost and operating cost.

Products

The process of this invention is especially useful in the production of middle distillate fractions boiling in the range of about 380-700° F. (193-371° C.). At least 75 vol %, preferably at least 85 vol % of the components of the middle distillate have a normal boiling point of greater than 380° F. (193° C.). At least about 75 vol %, preferably 85 vol % of the components of the middle distillate have a normal boiling point of less than 700° F. (371° C.).

Gasoline or naphtha may also be produced in the process of this invention. Gasoline or naphtha normally boils in the range below 380° F. (193° C.) but boiling above the boiling point of $C_5$ hydrocarbons, and sometimes referred to as a $C_5$ to 400° F. (204° C.) boiling range. Boiling ranges of various product fractions recovered in any particular refinery will vary with such factors as the characteristics of the crude oil source, local refinery markets and product prices.

The following examples will serve to illustrate, but not limit this invention.

Example 1

Preparation of Catalysts A1 and A2 (6% USY)

Preparation of conventional Catalyst A1 containing USY/ASA/alumina was prepared per following procedure. 9 wt-% USY (Zeolyst), 75 wt-% ASA powder (Siral-40 from Sasol), and 16 wt-% pseudo-boehmite alumina (CATAPAL B from Sasol) powder were mixed well. To this mix, a diluted $HNO_3$ acid aqueous solution (1 wt. %) was added to form an extrudable paste. The paste was extruded in 1/16" cylinder shape, and dried at 266° F. (130° C.) overnight. The dried base extrudates were calcined at 1184° F. (640° C.) for 1 hour with purging excess dry air, and cooled down to room temperature.

Impregnation of Ni and W was performed using a solution containing ammonium metatungstate and nickel nitrate in concentrations equal to the target metal loadings of 3.8 wt. % NiO and 25.3 wt. % $WO_3$ based on the bulk dry weight of the finished catalyst. Then the extrudates were dried at 250° F. (121° C.) for 1 hour and 350° F. (177° C.) for 1 hour. The dried extrudates were then calcined at 950° F. (510° C.) for 1 hour with purging excess dry air, and cooled down to room temperature.

Catalyst A2 of the present invention was prepared by following the same procedure as that used for Catalyst A1, except that 75 wt-% HNPV ASA powder, 16 wt-% of HNPV support material and 9 wt-% USY (Zeolyst) were used to make the base extrudate, Ni and W loading was adjusted to 4.8 wt. % NiO and 29.6 wt. % $WO_3$.

Preparation of Catalysts B1 and B2 (4% USY)

Conventional Catalyst B1 was prepared by following the same procedure as that used for Catalyst A1, except that the mixture was prepared by using 5.7 wt. % USY, 71.3 wt. % silica-alumina (Siral 40 from Sasol) and 23 wt. % pseudo-boehmite alumina powder (CATAPAL B from Sasol). The base extrudate was dried at 120° C. (248° C.) for 1 hour and calcined at 1100° F. (593° C.) for 1 hour. Impregnation of Ni and W was performed using a solution containing ammonium metatungstate and nickel nitrate in concentrations equal to the target metal loadings of 3.8 wt. % NiO and 25.3 wt. % $WO_3$ based on the bulk dry weight of the finished catalyst. After impregnation, the catalyst was dried at 270° F. (132° C.) for ½ hour and calcined at 950° F. (510° C.) for 1 hour.

Catalyst B2 of the present invention was prepared by following the same procedure as that used for Catalyst 2A, except that 72.7 wt-% HNPV ASA powder, 21.5 wt-% of HNPV support material and 5.8 wt-% USY (Zeolyst) were used to make the base extrudate, Ni and W loading was adjusted to 4.8 wt. % NiO and 29.6 wt. % $WO_3$.

Table 7 below is a summary of the composition of A1 through B2. Tables 8 and 9 below are a summary of the pore size distributions and nanopore volumes for the base extrudates, and Table 10 is a summary of the physical properties for the ASA and binder materials used in each catalyst.

TABLE 7

| Catalyst | ASA (wt. %) | Support (wt. %) | USY (wt. %) | Ni (wt. %) | W (wt. %) | Particle Density (g/cc) |
|---|---|---|---|---|---|---|
| A1 (conventional) | 53.2 | 11.3 | 6.3 | 3.8 | 25.3 | 1.35 |
| A2 (HNPV) | 49.2 | 10.5 | 5.9 | 4.8 | 29.6 | 1.34 |
| B1 (conventional) | 50.6 | 16.3 | 4.0 | 5.1 | 25.3 | 1.41 |
| B2 (HNPV) | 47.7 | 14.1 | 3.8 | 4.8 | 29.6 | 1.31 |

TABLE 8

| Base Extrudate | A1 (conventional) | A2 (HNPV) |
|---|---|---|
| d10 (nm) | 41 | 46 |
| d50 (nm) | 74 | 74 |
| d90 (nm) | 135 | 102 |
| Peak Pore Diameter (Å) | 69 | 75 |
| NPV-6 nm-11 nm (cc/g) | 0.35 | 0.6 |
| NPV-11 nm-20 nm (cc/g) | 0.08 | 0.05 |
| NPV-20 nm-50 nm (cc/g) | 0.03 | 0.01 |
| Total NPV (2-50 nm) (cc/g) | 0.67 | 0.88 |
| BET surface area (m²/g) | 379 | 434 |
| WPV, (g/cc) | 0.81 | 0.87 |
| particle density (g/cc) | 0.93 | 0.87 |

TABLE 9

| Base Extrudate | B1 (conventional) | B2 (HNPV) |
|---|---|---|
| d10 (nm) | 37 | 46 |
| d50 (nm) | 68 | 75 |
| d90 (nm) | 121 | 107 |
| Peak Pore Diameter (Å) | 69 | 75 |
| NPV-6 nm-11 nm (cc/g) | 0.33 | 0.6 |
| NPV-11 nm-20 nm (cc/g) | 0.07 | 0.07 |
| NPV-20 nm-50 nm (cc/g) | 0.02 | 0.01 |
| Total NPV (2-50 nm) (cc/g) | 0.67 | 0.9 |

TABLE 9-continued

| Base Extrudate | B1 (conventional) | B2 (HNPV) |
|---|---|---|
| BET surface area (m²/g) | 377 | 429 |
| WPV, (g/cc) | 0.84 | 0.93 |
| particle density (g/cc) | 1.01 | 0.85 |

TABLE 10

| | HNPV ASA | CONV. ASA | HNPV alumina | CONV. Alumina |
|---|---|---|---|---|
| d10 (nm) | 60 | 35 | 69 | 34 |
| d50 (nm) | 109 | 73 | 147 | 51 |
| d90 (nm) | 286 | 161 | 201 | 72 |
| Peak Pore Diameter (Å) | 89 | 57 | 167 | 51 |
| NPV-6 nm-11 nm (cc/g) | 0.7 | 0.41 | 0.18 | 0.012 |
| NPV-11 nm-20 nm (cc/g) | 0.5 | 0.16 | 0.54 | 0.01 |
| NPV-20 nm-50 nm (cc/g) | 0.34 | 0.06 | 0.09 | 0 |
| Total NPV (2-50 nm) (cc/g) | 1.71 | 0.98 | 0.87 | 0.5 |
| loose bulk density (g/mL) | 0.2 | 0.25-0.35 | 0.4-0.6 | 0.6-0.8 |
| BET surface area (m²/g) | 528 | 540 | 226 | 297 |

Example 2

Hydrocracking Performance

Catalysts A1 through B2 were used to process a typical Middle Eastern VGO. The feed properties are listed in Table 11. The run was operated in pilot plant unit under 2300 psig total pressure and 1.0-2.2 LHSV. The feed was passed a catalyst bed filled with hydrotreating catalyst before flowing into the hydrocracking zone. Prior to introduction of feed, the catalysts were activated either with DMDS (gas phase sulphiding) or with a diesel feed spiked with DMDS (liquid phase sulphiding).

The results of the tests are noted below in Tables 12 and 13. As Tables 12 and 13 indicate, Catalysts A2 and B2 achieved a 60% conversion at lower reaction temperatures (CAT) relative to conventional catalysts A1 and B1. In other words, Catalysts A2 and B2 were more catalytically active than their conventional counterparts, Catalysts A1 and B1, respectively.

Further, Catalysts A2 and B2 produced less undesirable gas and light ends ($C_4$- and $C_5$-180° F.) compared to conventional catalysts A1 and B1. Further, the desirable middle distillate (380-700° F.) yields for Catalysts A2 and B1 were higher than conventional catalysts A1 and B1.

The unconverted oil (UCO) (700° F.+) product for Catalysts A2 and B2, which is used in refineries as a base oil feedstock, exhibited higher waxy Viscosity Indexes (VI) and lower viscosities as compared to the UCO products for conventional catalysts A1 and B1.

TABLE 11

| Properties | Feedstock |
|---|---|
| Gravity, °API | 21 |
| N, ppm | 1140 |
| S, wt % | 2.3 |
| Polycyclic index (PCI) | 2333 |
| Distillation Temperature (wt %), ° F. (° C.) | |
| 5 | 708 (376) |
| 10 | 742 (394) |
| 30 | 810 (432) |
| 50 | 861 (461) |
| 70 | 913 (489) |
| 90 | 981 (527) |
| 95 | 1008 (542) |
| Entire product | 1069 (576) |

TABLE 12

| CATALYST | A1 (conventional) | A2 |
|---|---|---|
| CAT, ° F. (60% conv.) | base | −5 |
| Yields-by cut point | | |
| $C_4$-, wt % | 2.6 | 2.1 |
| $C_5$-180° F., lv % | 5.1 | 4.1 |
| 180-380° F., lv % | 23.6 | 24.2 |
| 380-530° F., lv % | 20.3 | 21.4 |
| 530-700° F., lv % | 20.5 | 21.1 |
| middle distillates (380-700° F.), lv % | 40.7 | 42.5 |
| % yield increase | base | +1.8 |
| UCO Properties (700° F.+) | | |
| UCO Waxy VI | 144 | 146 |
| UCO viscosity at 100° C. (cSt) | 5.564 | 5.070 |

TABLE 13

| CATALYST | B1 (conventional) | B2 |
|---|---|---|
| CAT, ° F. (60% conv.) | base | −10 |
| yields-by cut point | | |
| $C_4$-, wt % | 2.3 | 2.0 |
| $C_5$-180° F., lv % | 4.9 | 5.1 |
| 180-380° F., lv % | 25.9 | 25.3 |
| 380-530° F., lv % | 19.4 | 20.7 |
| 530-700° F., lv % | 19.9 | 20.0 |
| middle distillates (380-700° F.), lv % | 39.3 | 40.7 |
| % yield increase | base | 1.4 |
| UCO Properties (700° F.+) | | |
| UCO Waxy VI | 139 | 145 |
| UCO viscosity at 100° C. (cSt) | 5.565 | 5.281 |

While the invention has been described in detail and with reference to specific embodiments thereof, it will be apparent to one skilled in the art that various changes and modifications can be made without departing from the spirit and scope of the invention.

What is claimed is:

1. A hydrocracking catalyst, comprising:
   a base extrudate comprising at least one molecular sieve, an alumina and an amorphous silica alumina support, wherein the base extrudate has one or more of the following:
   a nanopore volume in the 6 nm to 11 nm range of 0.5 to 0.9 cc/g,
   a total nanopore volume in the 2 to 50 nm of 0.7 to 1.2 cc/g,
   a particle density of 0.7 to 0.9 g/cc; or
   the base extrudate is formed using an amorphous silica alumina support having a nanopore volume in the 6 nm to 11 nm range of 0.6 to 0.9 cc/g; and
   at least one metal selected from the group consisting of elements from Group 6 and Groups 8 through 10 of the Periodic Table.

2. The hydrocracking catalyst of claim 1, wherein the base extrudate is formed using an alumina having a nanopore volume in the 6 nm to 11 nm range of 0.1 to 0.3 cc/g.

3. The hydrocracking catalyst of claim 2, wherein the base extrudate is formed using an amorphous silica alumina support having a nanopore volume in the 6 nm to 11 nm range of 0.6 to 0.9 cc/g.

4. The hydrocracking catalyst of claim 1, wherein the base extrudate is formed using an amorphous silica alumina support having a nanopore volume in the 6 nm to 11 nm range of 0.6 to 0.9 cc/g.

5. The hydrocracking catalyst of claim 1, wherein the base extrudate has a total nanopore volume in the 2 to 50 nm of 0.7 to 1.2 cc/g.

6. The hydrocracking catalyst of claim 1, wherein the base extrudate has a particle density of 0.7 to 0.9 g/cc.

7. The hydrocracking catalyst of claim 1, wherein the base extrudate has a nanopore volume in the 6 nm to 11 nm range of 0.6 to 0.9 cc/g.

8. A method for making a hydrocracking catalyst, comprising the steps of:
   forming a base extrudate comprising at least one molecular sieve, an alumina and an amorphous silica alumina support, wherein the base extrudate has one or more of the following:
      a nanopore volume in the 6 nm to 11 nm range of 0.5 to 0.9 cc/g,
      a total nanopore volume in the 2 to 50 nm of 0.7 to 1.2 cc/g,
      a particle density of 0.7 to 0.9 g/cc; or
      the base extrudate is formed using an amorphous silica alumina support having a nanopore volume in the 6 nm to 11 nm range of 0.6 to 0.9 cc/g; and
   impregnating the base extrudate with at least one metal selected from the group consisting of elements from Group 6 and Groups 8 through 10 of the Periodic Table.

9. The method of claim 8, wherein the base extrudate is formed using an alumina having a nanopore volume in the 6 nm to 11 nm range of 0.1 to 0.3 cc/g.

10. The method of claim 9, wherein the base extrudate is formed using an amorphous silica alumina support having a nanopore volume in the 6 nm to 11 nm range of 0.6 to 0.9 cc/g.

11. The method of claim 8, wherein the base extrudate is formed using an amorphous silica alumina support having a nanopore volume in the 6 nm to 11 nm range of 0.6 to 0.9 cc/g.

12. The method of claim 8, wherein the base extrudate has a total nanopore volume in the 2 to 50 nm of 0.7 to 1.2 cc/g.

13. The method of claim 8, wherein the base extrudate has a particle density of 0.7 to 0.9 g/cc.

14. A process for hydrocracking a hydrocarbonaceous feedstock, comprising contacting the feedstock with a hydrocracking catalyst under hydrocracking conditions to produce a hydrocracked effluent;
   the hydrocracking catalyst comprising
      a base extrudate comprising at least one molecular sieve, an alumina and an amorphous silica alumina support, wherein the base extrudate has one or more of the following:
         a nanopore volume in the 6 nm to 11 nm range of 0.5 to 0.9 cc/g,
         a total nanopore volume in the 2 to 50 nm of 0.7 to 1.2 cc/g,
         a particle density of 0.7 to 0.9 g/cc; or
      the base extrudate is formed using an amorphous silica alumina support having a nanopore volume in the 6 nm to 11 nm range of 0.6 to 0.9 cc/g; and
      at least one metal selected from the group consisting of elements from Group 6 and Groups 8 through 10 of the Periodic Table.

15. The process of claim 14, wherein the base extrudate is formed using an alumina having a nanopore volume in the 6 nm to 11 nm range of 0.1 to 0.3 cc/g.

16. The process of claim 15, wherein the base extrudate is formed using an amorphous silica alumina support having a nanopore volume in the 6 nm to 11 nm range of 0.6 to 0.9 cc/g.

17. The process of claim 14, wherein the base extrudate is formed using an amorphous silica alumina support having a nanopore volume in the 6 nm to 11 nm range of 0.6 to 0.9 cc/g.

18. The process of claim 14, wherein the base extrudate has a nanopore volume in the 6 nm to 11 nm range of 0.5 to 0.9 cc/g.

19. The process of claim 14, wherein the base extrudate has a particle density of 0.7 to 0.9 g/cc.

20. The process of claim 14, wherein the base extrudate has a nanopore volume in the 6 nm to 11 nm range of 0.6 to 0.9 cc/g.

* * * * *